US010550764B2

(12) United States Patent
Roberge

(10) Patent No.: US 10,550,764 B2
(45) Date of Patent: Feb. 4, 2020

(54) ARCHITECTURE FOR AN AXIALLY COMPACT, HIGH PERFORMANCE PROPULSION SYSTEM

(71) Applicant: United Technologies Corporation, Farmington, CT (US)

(72) Inventor: Gary D. Roberge, Tolland, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 219 days.

(21) Appl. No.: 15/104,100

(22) PCT Filed: Sep. 9, 2014

(86) PCT No.: PCT/US2014/054733
§ 371 (c)(1),
(2) Date: Jun. 13, 2016

(87) PCT Pub. No.: WO2015/088606
PCT Pub. Date: Jun. 18, 2015

(65) Prior Publication Data
US 2016/0290226 A1 Oct. 6, 2016

Related U.S. Application Data

(60) Provisional application No. 61/915,971, filed on Dec. 13, 2013.

(51) Int. Cl.
*F02C 3/04* (2006.01)
*F02C 7/32* (2006.01)
(Continued)

(52) U.S. Cl.
CPC .............. *F02C 3/04* (2013.01); *F02C 3/073* (2013.01); *F02C 3/10* (2013.01); *F02C 3/145* (2013.01);
(Continued)

(58) Field of Classification Search
CPC . F02K 3/06; F02K 3/068; F02K 3/072; F02K 3/115; F02K 1/48; F02K 1/286;
(Continued)

(56) References Cited

U.S. PATENT DOCUMENTS 2,721,445 A * 10/1955 Giliberty ................. F02C 3/145
60/266
3,279,192 A * 10/1966 Hull, Jr. ................... F02K 1/085
60/264
(Continued)

FOREIGN PATENT DOCUMENTS

WO 02081883 A2 10/2002
WO WO 02081883 A2 * 10/2002 .............. F02C 3/045
WO 2006059977 A1 6/2006

OTHER PUBLICATIONS

Notification of Transmittal of the International Search Report of the International Searching Authority, or the Declaration; PCT/US2014/054733; dated Jun. 16, 2015. 3 pages.
(Continued)

*Primary Examiner* — Gerald L Sung
*Assistant Examiner* — Alain Chau
(74) *Attorney, Agent, or Firm* — Cantor Colburn LLP

(57) ABSTRACT

A reverse-core turbofan engine including a propulsor section including a fan and a fan-tip turbine configured to deliver air to a core duct, including a first portion, disposed aft of the propulsor section, and direct air aft, toward an inlet of a reverse-core gas generator, and a second portion, configured to receive air from an exit of the gas generator and direct the air forward and radially outward of the propulsor, toward the fan-tip turbine in the propulsor, thereby driving the propulsor.

7 Claims, 3 Drawing Sheets

(51) Int. Cl.
  *F02K 3/077* (2006.01)
  *F02C 3/073* (2006.01)
  *F02K 1/48* (2006.01)
  *F02K 3/115* (2006.01)
  *F02C 3/10* (2006.01)
  *F02K 3/068* (2006.01)
  *F02C 3/14* (2006.01)
  *F02K 3/06* (2006.01)
  *F02K 3/072* (2006.01)

(52) U.S. Cl.
  CPC .............. *F02C 7/32* (2013.01); *F02K 1/48* (2013.01); *F02K 3/06* (2013.01); *F02K 3/068* (2013.01); *F02K 3/072* (2013.01); *F02K 3/077* (2013.01); *F02K 3/115* (2013.01); *F05D 2220/32* (2013.01); *F05D 2220/323* (2013.01); *F05D 2220/76* (2013.01)

(58) Field of Classification Search
  CPC . F02K 1/386; F02K 3/04; F02K 3/077; F05D 2220/76; F05D 2220/32; F05D 2220/323; F02C 7/32; F02C 3/10; F02C 3/145; F01D 1/04; F01D 1/06
  See application file for complete search history.

(56) References Cited

U.S. PATENT DOCUMENTS

| | | | | |
|---|---|---|---|---|
| 6,966,174 B2* | 11/2005 | Paul | ............... | B64C 29/0075 60/224 |
| 7,237,378 B2* | 7/2007 | Lardellier | ............... | F02K 1/48 60/226.1 |
| 7,841,163 B2* | 11/2010 | Welch | ............... | F02C 7/262 60/226.1 |
| 7,882,694 B2* | 2/2011 | Suciu | ............... | F01D 17/162 60/226.1 |
| 7,927,075 B2* | 4/2011 | Suciu | ............... | F01D 5/02 416/175 |
| 7,934,902 B2* | 5/2011 | Suciu | ............... | F01D 5/022 415/150 |
| 7,937,927 B2* | 5/2011 | Suciu | ............... | F02C 3/073 60/268 |
| 8,061,968 B2* | 11/2011 | Merry | ............... | F01D 5/022 415/68 |
| 8,096,753 B2* | 1/2012 | Norris | ............... | F01D 5/022 415/122.1 |
| 8,176,725 B2* | 5/2012 | Norris | ............... | F02C 3/107 60/226.1 |
| 8,276,362 B2* | 10/2012 | Suciu | ............... | F01D 17/162 60/226.1 |
| 8,789,354 B2* | 7/2014 | Suciu | ............... | F02K 3/025 60/224 |
| 8,935,912 B2* | 1/2015 | Norris | ............... | F02K 3/105 60/226.1 |
| 8,950,171 B2* | 2/2015 | Suciu | ............... | F02C 3/073 60/204 |
| 9,003,768 B2* | 4/2015 | Suciu | ............... | F01D 17/162 60/226.1 |
| 2003/0192304 A1* | 10/2003 | Paul | ............... | B64C 29/0075 60/262 |
| 2005/0060983 A1 | 3/2005 | Lardellier | | |
| 2006/0108807 A1* | 5/2006 | Bouiller | ............... | F01D 15/10 290/52 |
| 2009/0148272 A1* | 6/2009 | Norris | ............... | F01D 5/022 415/144 |
| 2009/0148276 A1* | 6/2009 | Suciu | ............... | F01D 11/001 415/173.1 |
| 2009/0148297 A1* | 6/2009 | Suciu | ............... | F01D 5/02 416/219 R |
| 2009/0162187 A1* | 6/2009 | Merry | ............... | F01D 5/022 415/60 |
| 2009/0169385 A1* | 7/2009 | Suciu | ............... | F01D 5/022 416/179 |
| 2009/0232650 A1* | 9/2009 | Suciu | ............... | F02C 3/073 415/207 |
| 2012/0111018 A1* | 5/2012 | Norris | ............... | F01D 5/022 60/772 |
| 2012/0114468 A1* | 5/2012 | Elder | ............... | F02K 3/115 415/178 |
| 2012/0324901 A1* | 12/2012 | Allam | ............... | F01D 5/146 60/772 |
| 2013/0025286 A1 | 1/2013 | Kupratis | | |
| 2013/0145769 A1 | 6/2013 | Norris et al. | | |
| 2013/0183136 A1* | 7/2013 | Roberge | ............... | F02K 3/075 415/1 |
| 2013/0239576 A1 | 9/2013 | Kupratis et al. | | |
| 2013/0255224 A1 | 10/2013 | Kupratis et al. | | |
| 2014/0079530 A1* | 3/2014 | Ferch | ............... | F01D 15/10 415/1 |

OTHER PUBLICATIONS

Notification of Transmittal of the Written Opinion of the International Searching Authority, or the Declaration; PCT/US2014/054733; dated Jun. 16, 2015. 5 pages.

Extended European Search Report regarding related EP App. No. 14869066.2; dated Jul. 4, 2017; 7 pgs.

* cited by examiner

ARCHITECTURE FOR AN AXIALLY COMPACT, HIGH PERFORMANCE PROPULSION SYSTEM

CROSS REFERENCE TO RELATED APPLICATION

The present application is a National Phase Application of Patent Application PCT/US2014/054733 filed on Sep. 9, 2014, which is incorporated herein by reference thereto and is related to, and claims the priority benefit of U.S. Provisional Patent Application Ser. No. 61/915,971, filed Dec. 13, 2013. The contents of this application is also hereby incorporated by reference in its entirety into this disclosure.

TECHNICAL FIELD OF THE DISCLOSED EMBODIMENTS

The presently disclosed embodiments generally relate to gas turbine engines and, more particularly, to an architecture for an axially compact, high performance propulsion system.

BACKGROUND OF THE DISCLOSED EMBODIMENTS

Axial turbine engines generally include fan section, compressor, combustor and turbine sections positioned along a centerline referred to as the engines "axis of rotation". The fan, compressor, and combustor sections add work to air (also referred to as "core gas") flowing through the engine. The turbine extracts work from the core gas flow to drive the fan and compressor sections—typically via concentric drive shafts. The fan, compressor, and turbine sections each include a series of stator and rotor assemblies. The stator assemblies, which do not rotate (but may have variable pitch vanes), enable proper aerodynamics of the engine compressor and turbine by guiding core gas flow into or out of the rotor assemblies.

Current and projected future trends enabling improved fuel efficiency will tend to increase the number of compression stages and/or mechanical speeds to enable increased stage loading and/or as a means of increasing cycle overall pressure ratio. These changes may exacerbate existing challenges in shaft dynamics and rotor critical speeds as the compressor, combustor, and turbine sections increase in length and/or reduce in diameter. The net result may increase the length and decrease the diameter of the shaft; thus, creating an adverse effect on shaft critical speed and torque carrying capabilities. There is therefore a need for an engine architecture that improves fuel efficiency without creating adverse design and dynamic effects on the engine shaft.

BRIEF SUMMARY OF THE DISCLOSED EMBODIMENTS

In one aspect, a reverse-core turbofan engine architecture is provided. The reverse-core turbofan architecture includes a propulsor section configured to deliver air to an outer bypass duct and an inlet of an core duct positioned aft of the propulsor section. A heat exchanger may be disposed on the core duct. The propulsor section includes a fan and a fan-tip turbine. The propulsor section may include a first fan-tip turbine and a second fantip turbine configured to counter-rotate.

Air from the inlet of the core duct enters a first portion of the core duct and is directed in an axially backward direction from the propulsor section, then directed to flow in an axially forward direction toward the propulsor section into a reverse-core gas generator. The reverse-core gas generator including a compressor section, a combustor section, and a high pressure turbine section. A generator device may be operably coupled to the compressor section. Then, the air enters a second section of the core duct and directed to flow in a radially outward direction to the fan-tip turbine of the propulsor section. At least one hollow strut may be laterally disposed in the core duct operably coupling the high pressure turbine to the fan-tip turbine. Then, the air enters a third section of the core duct and flows in an axially forward direction before turning in an axially backward direction to an exit of the core duct. A lobe mixer may be operably coupled to the exit of the core duct.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

Figure 1:
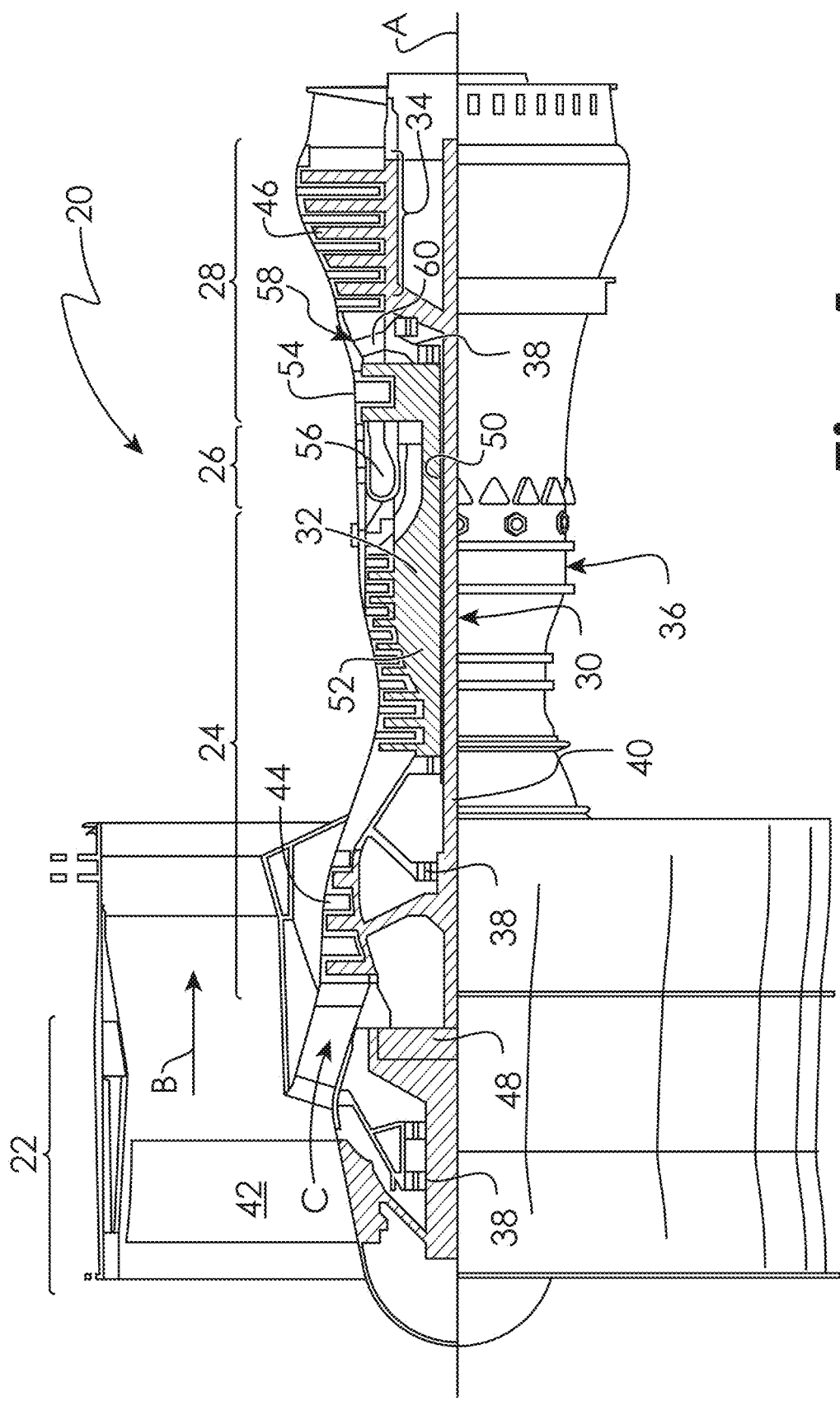
FIG. 1 is a general schematic view of a turbofan engine architecture.

An overview of the features, functions and/or configuration of the components depicted in the figures will now be presented. It should be appreciated that not all of the features of the components of the figures are necessarily described. Some of these non-discussed features, as well as discussed features are inherent from the figures. Other non-discussed features may be inherent in component geometry and/or configuration.

DETAILED DESCRIPTION OF THE DRAWINGS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates a typical architecture for a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second.

Figure 2:
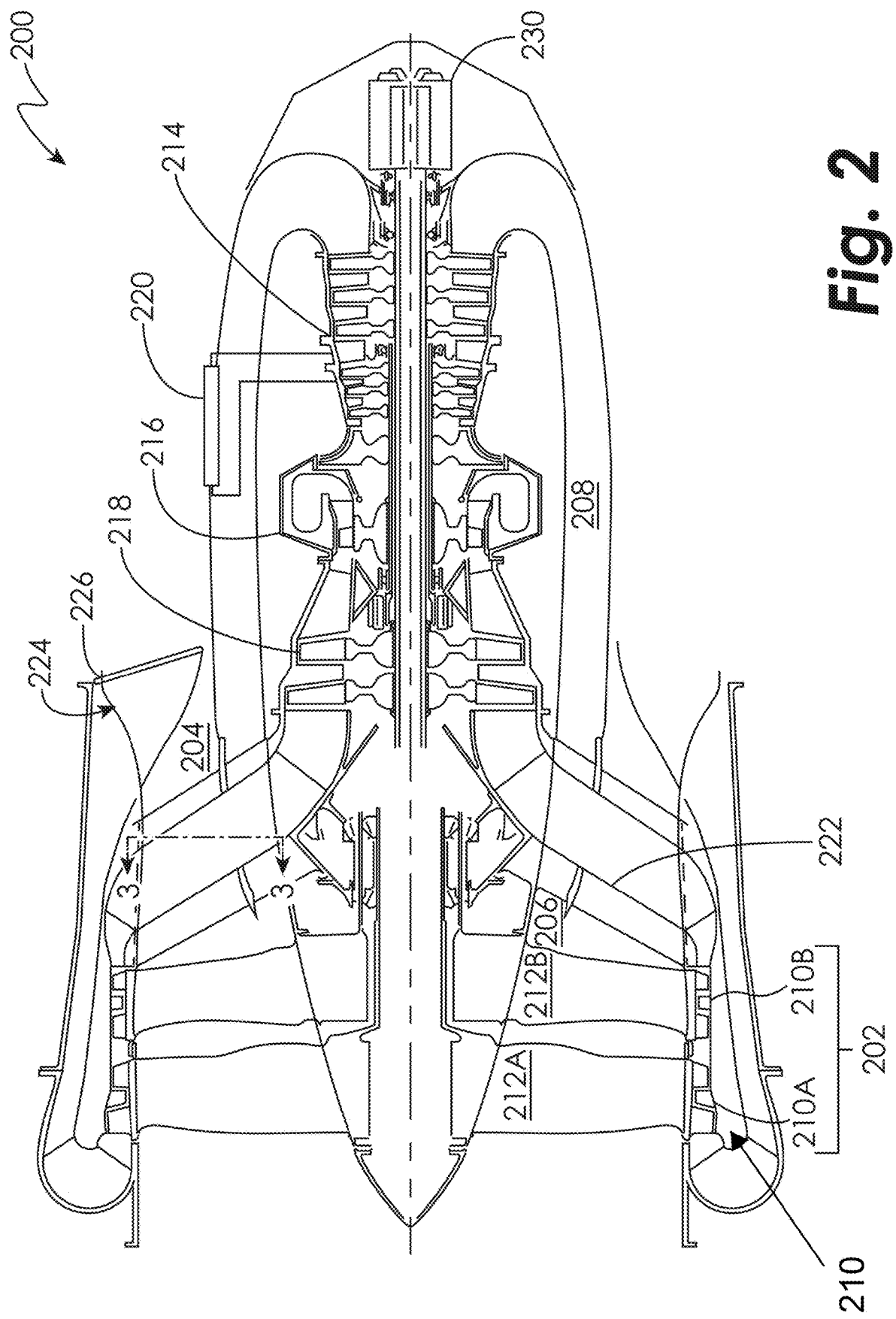
FIG. 2 is a cross-sectional diagram of a turbofan engine architecture according to an embodiment of the present disclosure platform.

FIG. 2 illustrates a reverse-core turbofan engine architecture 200 according to an embodiment of the present disclosure. The reverse-core engine architecture 200 includes propulsor section 202 configured to deliver air to an outer bypass duct 204 and an inlet 206 of a core duct 208 positioned aft of the propulsor section 202 The propulsor section 202 includes a fan-tip turbine 210 axially aligned and radially exterior to a fan 212 as shown in U.S. Pat. No. 8,033,092 to Suciu et al. in an embodiment. The propulsor section 202 may include a first fan 212A and a second fan-212B configured to counter-rotate to alleviate the need for an inter-stage fan vane. The fan-tip turbine 210 may include multiple stages, such as stages 210A and 210B.

The air from the inlet 206 of the core duct 208 enters a first portion of the core duct 208 and directed in an axially aft direction from the propulsor section 202, then directed to flow in an axially forward direction toward the propulsor section 202 into a compressor section 214 of a reverse-core gas generator. At least one vane (not shown) may be disposed within the first portion of the core duct 208 to guide or turn the flow in an effective manner as it alters direction. It will be appreciated that the propulsor section 202 and the compressor section 214 are fluidly coupled, meaning, the airflow from the propulsor section 202 drives the compressor section 214 rather than a direct mechanical connection (e.g. a shaft or gearbox) between the two sections. It will be appreciated that since the propulsor section 202 and the compressor section 214 are fluidly coupled, the bore or inner diameter of each disk in the propulsor section 202 may be reduced or eliminated to enable a more efficient structure (i.e. lighter weight).

The air in the core duct 208 exits the compressor section 214 and continues to travel in an axially forward direction through a combustor section 216, and a high pressure turbine 218 of the reverse-core gas generator. A heat exchanger 220 may be disposed on the core duct 208. The heat exchanger 220 may be configured to allow air to circulate therethrough. For example, air may be collected and extracted from the compressor section 214 and cooled by the air from the outer bypass duct 204. The reverse flow nature of the compressor section 214 relative to the air flow from the outer bypass duct results in a natural counter-flow arrangement for cycle intercooling (achieving higher pressure while reducing the typical air temperature to address material or structural limitations for the exit of the compressor section 214, combustor section 216, or the high pressure turbine 218) or to reduce the temperature of the circulated air to provide enhanced cooling properties to name a couple of non-limiting examples.

Figure 3:
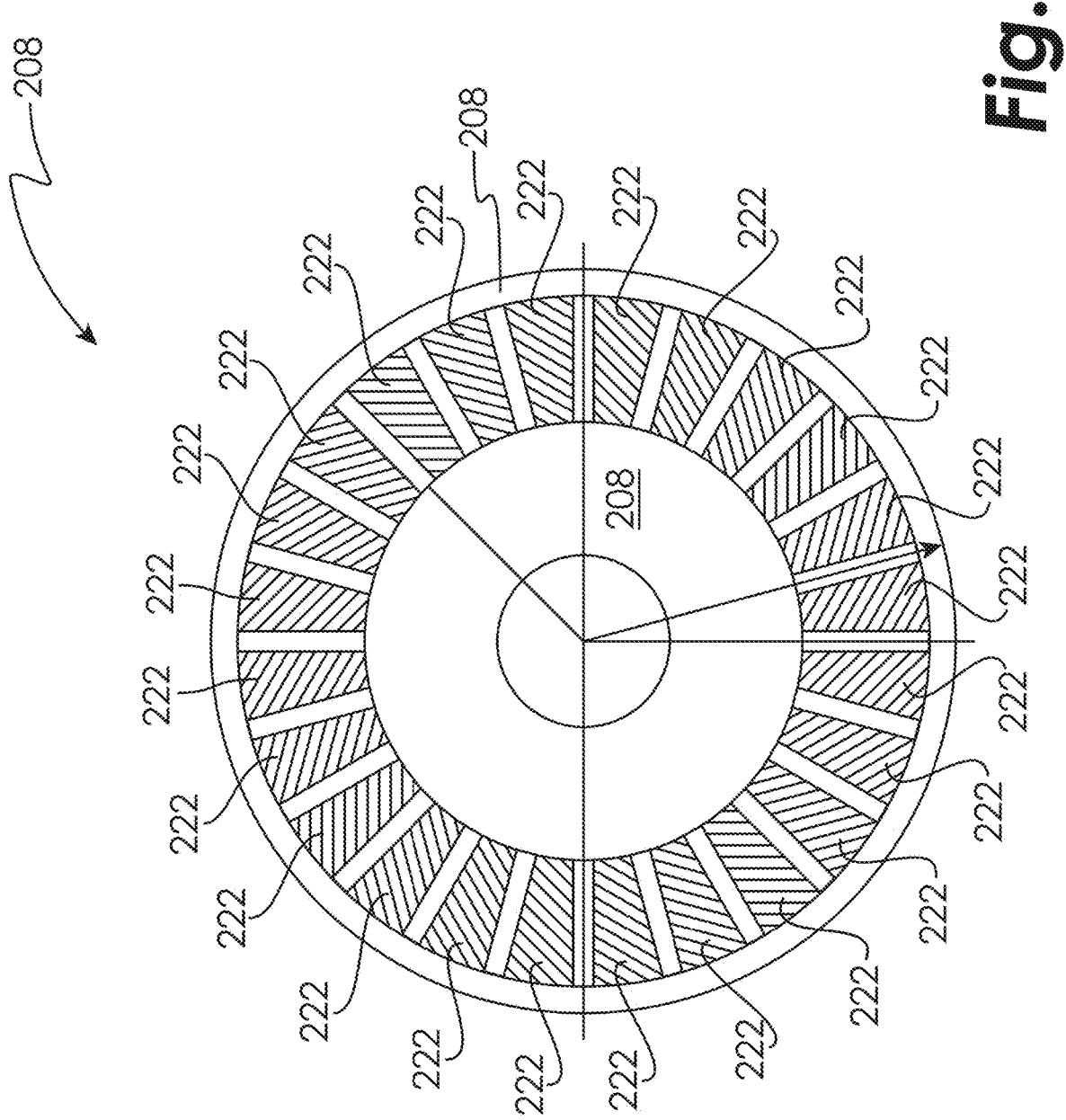
FIG. 3 is a cross-sectional diagram of an inner core duct according an embodiment of the present disclosure platform.

The air continues through the high pressure turbine 218 and enters a second portion of the core duct 208 where the air is directed to flow in a radially outward direction to the turbine 210. At least one hollow strut 222 may be laterally disposed in the core duct 208 operably coupling the high pressure turbine 218 to the fan-tip turbine 210. As shown in FIG. 3, the at least one hollow strut 222 may serve as exit guide vanes for air flowing along the outer bypass duct 204. It will also be appreciated that as the air flows radially outward in the core duct 208, it is cooled by the air flowing along the outer bypass duct 204 passing through the at least one hollow strut 222.

The air continues through the fan-tip turbine 210 and enters a third portion of the core duct 208, where the air continues flowing in an axially forward direction before turning in an axially aft direction to an exit 224 of the core duct 208. At least one vane (not shown) may be disposed within the third portion of the core duct 208 to guide or turn the flow in an effective manner as it alters direction. A lobe mixer 226 may be operably coupled to the exit 224 of the core duct 208. The lobe mixer 226 may be configured to mix the air exiting the core duct 208 with the air flowing through the outer bypass duct 204 to further cool the discharged gas from the turbine 210.

The reverse-core turbofan engine architecture 200 may include a generator device 230 operably coupled to the compressor section 214. The generator device 230 may be configured to provide supplemental power extracted from a spool (not shown) affixed to the compressor section 214, or may be operated as a starter and/or generator combination.

It will be appreciated from the present disclosure that the embodiments disclosed herein provide for a reverse-core turbofan engine architecture 200, wherein the propulsor section 202 and the compressor section 214 are fluidly coupled to aid in reducing the weight of the engine. It will also be appreciated that the core duct 208 includes at least one hollow strut 222 laterally disposed between the high pressure turbine 218 and the turbine 210 to aid in reducing the temperature of the air leaving the high pressure turbine 218 of the reveres-core gas generator. It will also be appreciated that the reverse-core turbofan engine architecture 200 provides a mixed flow of air at a low enough temperature to enable light-weight materials, for example titanium and organic matrix composite to name a couple of non-limiting examples, to be used.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A reverse-core turbofan engine comprising:
    a propulsor section including a fan and a fan-tip turbine, the propulsor section directing air toward a bypass splitter to divide the air into a first airstream and a second airstream;
    a reverse-core gas generator including a compressor section, a combustor section, and a high pressure turbine section, and
    a core duct including:
        a first portion, disposed aft of the propulsor section, configured to receive the first airstream from the propulsor section, and direct air aft, toward an inlet of the reverse-core gas generator;
        a second portion, configured to receive air from an exit of the reverse-core gas generator and direct the air forward and radially outward of the propulsor section, toward the fan-tip turbine in the propulsor section, thereby driving the propulsor section;
        at least one hollow strut disposed within the core duct and positioned between the high pressure turbine section and the fan-tip turbine, the at least one hollow strut being an exit guide vane for the second airstream;
        a lobe mixer operably coupled to an exit of the core duct;
        a heat exchanger operatively coupled to the core duct, the core duct operatively coupled to the compressor section, the heat exchanger located axially aft of, and radially inwardly of, the lobe mixer; and
        a generator device operably coupled to the compressor section, the generator device directly mounted to a rotor shaft.

2. The reverse-core turbofan engine of claim 1, wherein the core duct further includes a third portion, configured to receive air from an exit in the fan-tip turbine and direct the air aft, toward the exit of the core duct.

3. The reverse-core turbofan engine of claim 2, further comprising a bypass duct radially exterior to an inlet of the core duct, and radially interior to the third portion of the core duct.

4. The reverse-core turbofan engine of claim 1, wherein the at least one hollow strut is laterally disposed within the core duct.

5. The reverse-core turbine engine of claim 1, wherein the fan-tip turbine includes a first fan-turbine rotor and a second fan-turbine rotor.

6. The reverse-core turbine engine of claim 5, wherein the first fan-tip turbine rotor is configured to rotate in an opposite direction from the second fan-tip turbine rotor.

7. The reverse-core turbofan engine of claim 1, wherein the fan-tip turbine is fluidly coupled to the compressor section.

* * * * *